United States Patent [19]

Ciniglio et al.

[11] Patent Number: 4,651,916
[45] Date of Patent: Mar. 24, 1987

[54] SOLDERING APPARATUS

[75] Inventors: Alexander J. Ciniglio, Brentwood; Michael Tombs, Woodford Green, both of England

[73] Assignee: Dolphin Machinery Limited, Woodford Green, England

[21] Appl. No.: 684,504

[22] Filed: Dec. 21, 1984

[51] Int. Cl.[4] .............................................. B23K 3/06
[52] U.S. Cl. ...................................... 228/37; 228/56.1; 228/180.1; 228/260
[58] Field of Search ....................... 228/37, 56.1, 56.2, 228/180.1, 260; 118/429, 421

[56] References Cited

U.S. PATENT DOCUMENTS

| 3,058,441 | 10/1962 | Walker et al. | 118/429 X |
| 3,566,891 | 3/1971 | Koch, II | 118/421 X |
| 3,598,086 | 8/1971 | Kushima | 118/429 X |
| 3,752,383 | 8/1973 | Allen et al. | 228/37 |
| 4,072,777 | 2/1978 | Schoenthaler | 118/429 X |
| 4,113,165 | 9/1978 | Ott | 228/56.1 |

FOREIGN PATENT DOCUMENTS

| 2740139 | 4/1978 | Fed. Rep. of Germany . |
| 3205276 | 10/1982 | Fed. Rep. of Germany . |
| 801510 | 9/1958 | United Kingdom . |
| 1556313 | 11/1979 | United Kingdom . |
| 1556546 | 11/1979 | United Kingdom . |
| 2069905 | 2/1980 | United Kingdom . |
| 617196 | 7/1978 | U.S.S.R. ................................ 228/37 |

Primary Examiner—Kuang Y. Lin
Attorney, Agent, or Firm—Scully, Scott, Murphy & Presser

[57] ABSTRACT

A soldering apparatus comprises a solder bath, an applicator for applying solder to a joint or the like to be soldered and a pump for pumping solder substantially continuously through the applicator. The applicator is movable vertically relative to the solder bath to solder a joint positioned above the bath.

14 Claims, 5 Drawing Figures

SOLDERING APPARATUS

INTRODUCTION

The present invention relates to soldering apparatus of the type in which solder is pumped through an applicator which is used for applying solder to a joint or the like.

BACKGROUND TO THE INVENTION

GB No. 801510 discloses a soldering apparatus in which solder is pumped continuously from a container to a storage chamber having a pluraity of orifices in the form of upwardly extending tubes through which solder is pumped. The apparatus is supported on a table which is movable vertically by a rotating cam. An article to be soldered is moved into position above the apparatus and the table is then raised to touch the solder leaving the tubes, to solder the article. Heaters are provided in both the container and storage chamber. A flux applicator is also positioned on the table, downstream of the soldering apparatus, for applying flux prior to soldering.

GB No. 1556546 discloses a wave soldering device in which solder is pumped upwardly through a nozzle which tapers towards its upper, open end. The nozzle is canted over so that the solder leaves the nozzle in the form of a wave. Articles to be soldered are then passed across the top of the wave.

SUMMARY OF THE INVENTION

The present invention provides soldering apparatus comprising a solder bath, an applicator for applying solder, and means for pumping solder from the solder bath through the applicator substantially continuously, wherein means is provided for moving the applicator vertically relative to the solder bath whilst solder is pumped through the applicator substantially continuously.

By flowing solder through the applicator, contaminants or dross which build up on the solder surface during a soldering operation are washed away, providing a clear solder surface for the next soldering operation. When soldering plastics coated leads there may be a substantial build up of contamination during soldering, by maintaining a substantial flow the contaminants are washed away continuously to ensure a clean solder joint.

Preferably the solder is pumped into an enlarged lower region of the applicator and overflows the top of the applicator. The power of the pump may be such that at the top of the applicator's range of movement the head of the solder just balances the pumping force, to stop the flow of solder at the point of soldering.

By providing a movable applicator, and a wide range of applicator shapes and sizes, the soldering apparatus is particularly suited to applications where there is limited access to the soldering point. Also, by flowing solder through the applicator, an applicator of small size may be used, for example a tube of only a few millimeters diameter, since the flow of solder, which is pumped from a large solder bath or reservoir, prevents the solder cooling below soldering temperature when a cold tag or the like is immersed in the solder. It has been found that the temperature of the solder at the top of the applicator may be maintained to within less than a degree of the bath temperature.

Advantageously the flow of solder may be pulsed to provide a burst of increased solder flow at intervals to clear the solder surface.

In a preferred manner of operating the invention, the applicator is mounted with its upper end above a bath of solder. Solder is pumped into the bottom of the applicator to maintain a constant, minimum flow of solder up through the applicator, the solder flowing out over an upper lip of the applicator. The upper lip of the applicator is held just above the level of solder in the solder bath, say 5 mm, an article to be soldered is brought into position above the applicator and the applicator is then raised to touch the surface of the solder against the article or part to be soldered. The flow of solder may be increased for a brief period or pulsed. After the soldering operation the applicator is lowered and then the flow of solder may again be increased for a brief period or pulsed. The operation is then repeated for soldering another article or part.

It is believed that during a constant flow period a thin skin forms on the exposed solder at the exit from the applicator and on the stream of solder returning to the pot. By maintaining a constant, low flow rate disruption of the skin is minimised or obviated, thus reducing exposure of fresh solder to the air and so minimising the formation of new skin, and by maintaining a continuous flow solder skin will not fall back into the applicator. After a soldering operation the surface of the solder is normally contaminated with waste products which tend to stick to the film on the solder surface and so may remain in position at the top of the applicator, affecting the next soldering operation. By pulsing the flow of solder, shortly after a soldering operation, the contaminants can be more effectively washed away from the top of the applicator, where a fresh skin is quickly formed. The contaminants accumulate as dross on the top of the solder bath in the usual manner.

It has been found that the shape of the applicator is important. Preferably the applicator comprises an upper chamber, opened at the upper end where soldering takes place, and a lower, large chamber connected thereto. Solder is pumped into the lower chamber from where it rises steadily up the applicator with a substantially constant flow rate across the upper chamber, allowing for even, controlled flow throughout the upper chamber to give a smooth surface to the solder flowing over the top of the applicator. Preferably the upper chamber is of narrow cross-section. Preferably the outsides of the applicator above the surface of the solder in the pot are substantially vertical, or angled inwards so that solder flowing over the top edge of the applicator will not run down the side walls, thus ensuring even flow of the solder back into the pot. Preferably the upper edge of the applicator is angled to the horizontal so that there is a preferred direction of flow of the solder from the applicator.

The applicator may be rectangular or circular cross-section. A small diameter tube may be used on the upper chamber with particular advantage where the access to a part to be soldered is limited. Hypodermic needles may prove particularly suitable in some applications.

Preferably the top of the applicator is kept above the surface of the solder bath all the time.

It has been found that the arrangement of the invention allows the solder to be kept at high temperatures, 400°–500° C., without the very rapid accumulation of dross experienced in other systems.

DESCRIPTION OF THE PREFERRED EMBODIMENT

Figure 1:
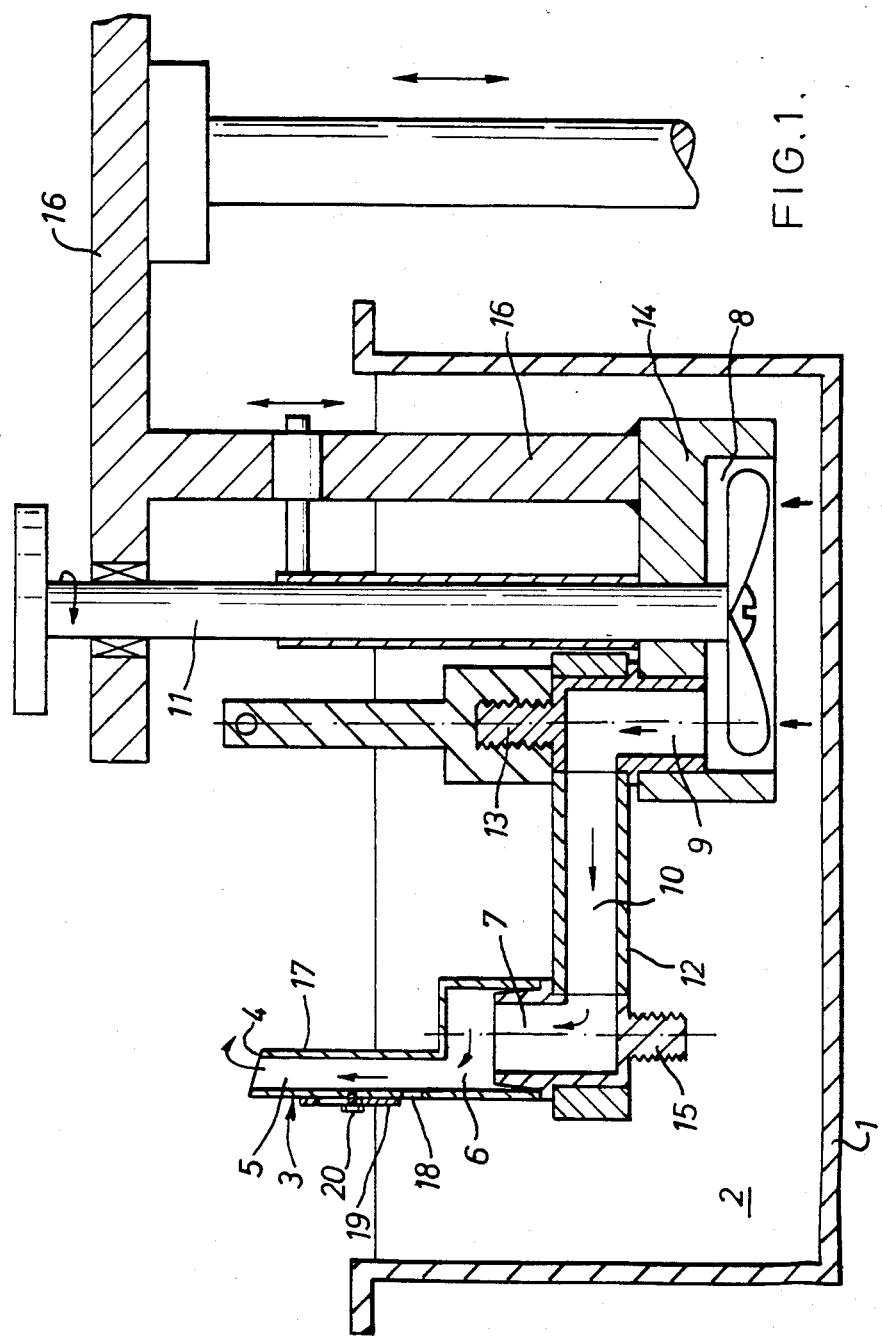
FIG. 1 is an illustration in cross-section of an apparatus according to the invention.

In FIG. 1, a bath 1 contains molten solder 2, heated by a thermostatically controlled heater (not shown). An applicator 3 is supported in the solder bath with its upper lip 4 a few millimeters above the surface of the molten solder. The applicator comprises a narrow cross-section upper chamber 5 and a larger, expansion chamber 6 (see FIG. 2). Solder is pumped into the expansion chamber 6 through a comparatively small orifice 7. The larger volume of the expansion chamber 6 ensures that the flow of solder is spread throughout the applicator, particularly in the upper chamber 5, so that there is an even flow across the top of the applicator, avoiding the need for baffles etc to distribute the flow. Solder is fed to the orifice 7 from a chamber 8 via connecting conduits 9, 10. An impeller 11, driven from above by a motor (not shown) drives solder into the chamber 8 to pump it through the conduits 9, 10. Arm 12, containing conduit 10 is mounted on a tapering boss 13 which is rotatably mounted in block 14. Hence the arm may pivot about the axis of boss 13, with the passage of solder from conduit 9 to conduit 10 being maintained. Applicator 3 is pivotably mounted on boss 15 which is similar to boss 13 but upside down. Hence the applicator may be moved through the bath in an arc about the axis of boss 13 and rotate about the axis of boss 15.

The block 14 supports arm 10 and applicator 3 in the solder bath. Block 14 is suspended from an arm 16 which is mounted outside the bath and is movable vertically, as indicated by the double headed arrows. Impellor 11 is mounted to move with block 14, and chamber 8.

The shape of the applicator, particularly the upper chamber 5 is adapted to the article to be soldered. Soldering operations where the tag etc is located in a recess will normally require a tubular upper chamber of small cross-section, for example 2–3 mm diameter. Hypodermic needles may be used to advantage.

Figure 2:
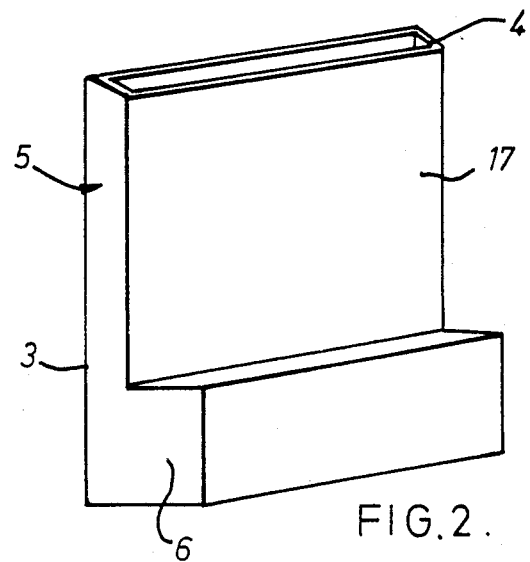
FIG. 2 is a perspective view of an applicator of the apparatus of FIG. 1.

As shown in FIGS. 1 and 2, the upper lip 4 of the applicator is shaped so that the solder will flow over the lower side 17. This allows for greater control over the solder flow, enabling the disturbance of the solder skin to be kept to a minimum. Side wall 17 is vertical so that solder will stream into the pot from the upper lip 4 without contacting the side wall 17.

An indexing device (not shown), such as a turntable is located adjacent the bath. The indexer will have a number of arms on which articles to be soldered are mounted. Each arm moves from a first position at which an article is mounted on the arm, to a second position where flux is applied to the tags etc to be soldered, to a third position above the applicator 3 for soldering, a fourth position where the article may be tested, for example for electrical continuity at the solder joint, and a fifth position where the article is removed.

A soldering operation is performed as follows. The item to be soldered is indexed to a position above the applicator 3. A steady flow of solder is maintained through the applicator and the applicator is raised to touch the surface of the solder, at the lip 4, on the item to be soldered, by raising arm 16. The degree of lift of arm 16 may be variable and controlled via a programmable micro-processor etc. Preferably the solder is flowed continuously through the applicator, but the pump speed may be adjusted so that the pumping force is balanced by the head of the solder at the upper limit of the applicator movement. It is considered to be important that the solder level in the applicator does not fall, thus taking contaminants down into the applicator. The applicator is then lowered with arm 16. The flow of solder through the applicator may then be increased, by increasing the speed of rotation of impeller 11, for a short period to clear contamination from the solder surface at the lip 4 of the applicator. In the meantime a new item is indexed into position above the applicator.

For overall control of the rate of flow of solder through the applicator(s) the pump speed may be changed. However, it is preferred that an aperture (18) be provided in a sidewall of the applicator, preferably the upper chamber 5, the size of the aperture is preferably variable, for example by means of a sliding cover 19, which is held in position by a screw 20 to allow controlled leakage of molten solder from the applicator. The aperture may be provided at a point which remains below the solder surface, to minimise the exposure of solder to the atmosphere, and hence the formation of dross.

Figure 3:
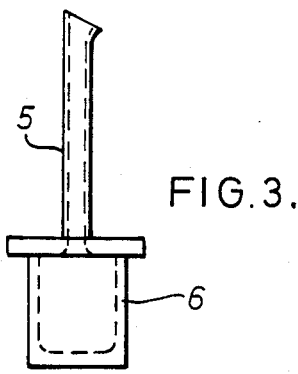
FIG. 3 shows in side view an upper chamber of another form of applicator.
Figure 4A:
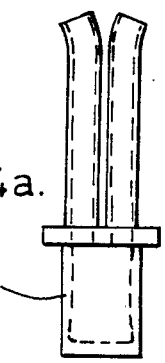
FIGS. 4a and 4b show side and perspective views of yet another form of applicator.
Figure 4B:
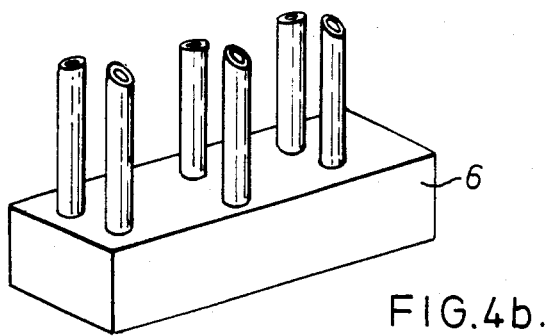

The applicator of FIG. 2 provides an elongate rectangular solder surface for touching against an article to be soldered, for example a row of tags on a relay. FIG. 3 shows an applicator having a single, tubular upper chamber 5 suitable for soldering in a confined area or recess. In this case an aperture may be provided in the lower chamber 6. FIGS. 4a and 4b show that a number of upper chambers may be used, each being positioned to solder in a respective recess. In the embodiment of FIGS. 4a and 4b the upper ends of the tubes are curved over to direct overflowing solder away from the adjacent tubes. The direction of curvature will also be arranged to take into account the article being soldered. Advantageously the tubes are threadedly connected to the lower chamber 6 so that tubes can be readily removed or replaced, blanking plugs being used to seal the chamber where tubes have been removed.

The applicator 3 may be adjusted horizontally by rotating the upwardly extending arm 17, mounted on the boss 13, to pivot the arm 12, and as mentioned may also be rotated about the boss 15.

Two or more applicators may be mounted on the block 14, via respective arms 12 etc. The relative positions of the applicators may be adjusted by means of a threaded rod (not shown), threadedly connected to the respective arms 12 or the applicators 3.

It will be appreciated that types of pumps other than impellor 11 may be employed, however impellor 11 has been found to be simple and reliable in operation.

What we claim is:

1. Solderings apparatus comprising
    a solder bath for holding a supply of molten solder;
    an applicator for applying molten solder to a work piece;
    support means holding the applicator in the support bath, and including (i) conduit means to conduct a solder from the solder bath and into the applicator, and (ii) means supporting the applicator for horizontal movement relative to the support bath; and pump means supported in the solder bath to pump solder therefrom, through the conduit means and through the applicator to the work piece;

means connected to the support means to move the support means and thereby move the applicator and the conduit means relative to the solder bath, vertically toward and away from the work piece;

additional means to maintain the solder flow through the applicator at a substantially constant rate.

2. Soldering apparatus according to claim 1 wherein:
the applicator includes an upper lip;
the support means holds the applicator with the upper lip above the molten solder in the solder bath; and
the pump means pumps solder over the upper lip.

3. Soldering apparatus according to claim 1 wherein:
the means supporting the applicator for horizontal movement includes an arm having a first end supported for horizontal pivotal movement; and
the applicator is pivotally mounted on a second end of the arm.

4. Soldering apparatus according to claim 3 wherein the applicator includes a lower chamber in communication with the conduit means to receive solder therefrom, and an upper chamber contiguous with and in communication with the lower chamber to receive solder therefrom.

5. Soldering apparatus according to claim 4 wherein the upper chamber includes a plurality of tubes.

6. Soldering apparatus according to claim 1 wherein the pump means includes means to pulse the flow of solder through the applicator.

7. Soldering apparatus according to claim 1 wherein the pump means includes
means defining a chamber having an inlet in fluid communication with the solder bath, and an outlet in fluid communication with the conduit; and
a propellor mounted within the chamber.

8. Soldering apparatus comprising:
a solder bath for holding a supply of molten solder;
an applicator for applying molten solder to a work piece;
support means holding the applicator in the support bath, and including conduit means to conduct solder from the solder bath and into the applicator;
pump means supported in the solder bath to pump solder therefrom, through the conduit means and through the applicator to the work piece, and including
(i) means defining a chamber having an inlet in fluid communication with the solder bath, and an outlet in fluid communication with the conduit, and
(ii) a propeller mounted within the chamber; and
means connected to the support means to move the support means and thereby move the applicator and the conduit means relative to the solder bath, vertically toward and away from the work piece; wherein
the conduit means is pivotally connected to the means defining the chamber; and
the applicator is pivotally mounted on the conduit means.

9. Soldering apparatus according to claim 8 wherein the applicator includes a control aperture to adjust the rate at which solder is pumped through the applicator to the workpiece.

10. Soldering apparatus comprising:
a solder bath for holding a supply of molten solder;
an applicator for applying molten solder to a work piece and including a discharge opening to conduct solder to the workpiece, and a bleed opening to discharge solder from the applicator and away from the workpiece;
support means holding the applicator in the support bath, and including conduit means to conduct solder from the solder bath and into the applicator;
pump means supported in the solder bath to pump solder therefrom, through the conduit means and through the applicator to the work piece;
means connected to the support means to move the support means and thereby move the applicator and the conduit means relative to the solder bath, vertically toward and away from the work piece; and
a control slider connected to the applicator for movement across the bleed opening to control the flow of solder therethrough and the flow rate of solder to the workpiece.

11. Soldering apparatus according to claim 10 wherein the bleed opening is located below a preset level to discharge solder from the applicator directly into the molten solder without exposing to the atmosphere the solder discharge from the bleed opening.

12. Soldering apparatus according to claim 11 further comprising screw means located above said preset level and connecting the control slider to the applicator.

13. Soldering apparatus comprising:
a solder bath for holding a supply of molten solder;
an applicator for applying molten solder to a work piece;
support means holding the applicator in the support bath, and including
(i) a vertical section extending into the solder bath, and
(ii) conduit means to conduct solder from the solder bath and into the applicator, wherein
the conduit means includes first and second ends,
the first end of the conduit means is connected to the vertical section for horizontal pivotal movement relative thereto, and
the applicator is mounted on the second end of the conduit means for horizontal pivotal movement relative thereto,
pump means supported in the solder bath to pump solder therefrom, through the conduit means and through the applicator to the work piece; and
means connected to the support means to move the support means and thereby move the applicator and the conduit means relative to the solder bath, vertically toward and away from, the work piece.

14. Soldering apparatus according to claim 13 wherein:
a lower end of the vertical section includes a pumping chamber having an inlet in fluid communication with the solder bath, and an outlet;
the conduit means is connected to the lower end of the vertical section in fluid communication with the outlet of the pumping chamber;
the pump means includes
(i) a rotatable pump shaft connected to the vertical section for vertical movement therewith, and having a first end located in the pumping chamber, and
(ii) a propeller mounted on the first end of the pump shaft for rotation therewith.

* * * * *